United States Patent
Bojsen

(10) Patent No.: US 9,668,424 B2
(45) Date of Patent: Jun. 6, 2017

(54) AXIAL-FLOW CROP PROCESSOR IN A COMBINE HARVESTER

(71) Applicant: AGCO INTERNATIONAL GmbH, Hesston, KS (US)

(72) Inventor: Thomas Mygind Bojsen, Randers (DK)

(73) Assignee: AGCO International GmbH, Neuhausen (CH)

( * ) Notice: Subject to any disclaimer, the term of this patent is extended or adjusted under 35 U.S.C. 154(b) by 0 days.

(21) Appl. No.: 15/058,402

(22) Filed: Mar. 2, 2016

(65) Prior Publication Data

US 2016/0262310 A1 Sep. 15, 2016

(30) Foreign Application Priority Data

Mar. 10, 2015 (GB) .................................. 1504031.4

(51) Int. Cl.
*A01F 7/06* (2006.01)

(52) U.S. Cl.
CPC .................................. *A01F 7/067* (2013.01)

(58) Field of Classification Search
CPC ....... A01D 41/1271; A01F 7/06; A01F 7/067; A01F 12/10; A01F 12/26; A01F 12/442
USPC .................................. 460/62–70, 107, 109
See application file for complete search history.

(56) References Cited

U.S. PATENT DOCUMENTS

| 5,334,093 | A | * | 8/1994 | Jensen | ................... | A01F 12/442 460/107 |
| 5,344,367 | A | * | 9/1994 | Gerber | .................... | A01F 12/10 460/68 |
| 6,325,713 | B1 | | 12/2001 | Haar et al. | | |
| 6,358,142 | B1 | | 3/2002 | Imel et al. | | |
| 6,500,063 | B1 | * | 12/2002 | Gryspeerdt | ........ | A01D 41/1271 460/66 |
| 6,802,771 | B2 | * | 10/2004 | Schwersmann | ....... | A01F 12/442 460/109 |
| 8,221,202 | B2 | * | 7/2012 | Pope | ......................... | A01F 7/06 460/68 |
| 8,231,446 | B2 | * | 7/2012 | Pope | ....................... | A01F 7/067 460/62 |
| 2009/0011807 | A1 | | 1/2009 | Becker et al. | | |
| 2009/0143123 | A1 | | 6/2009 | Pope et al. | | |
| 2014/0179382 | A1 | | 6/2014 | Regier | | |

FOREIGN PATENT DOCUMENTS

| GB | 2065437 A | 7/1981 |
| WO | 2015/075516 A1 | 5/2015 |

OTHER PUBLICATIONS

UK Intellectual Property Office, International Search Report for UK Priority Application No. GB1504031.4, dated Aug. 13, 2015.

* cited by examiner

*Primary Examiner* — Robert Pezzuto

(57) ABSTRACT

A rotor top cover assembly for an axial-flow crop processor in a combine harvester is provided. The cover assembly comprises first and second curved cover plate sections at least one of which sections forming an upper part of a generally cylindrical shaped rotor housing for a crop processing rotor. A curved transition plate nests radially inside, and is fastened to, adjoining respective end regions of the cover plate sections. Helical guide vanes are mounted in an axially spaced relationship along an inner surface of at least one of the cover plate sections. At least one guide vane is mounted directly to the transition plate.

5 Claims, 5 Drawing Sheets

AXIAL-FLOW CROP PROCESSOR IN A COMBINE HARVESTER

BACKGROUND

Field of Invention

The present invention relates to a rotor housing cover assembly for a combine harvester, the cover assembly comprising first and second curved cover plate sections, at least one of which sections forming an upper part of a generally cylindrical shaped rotor housing for a crop processing rotor.

Description of Related Art

Axial-flow or rotary combine harvesters usually have one or two crop processing rotors having a rotation axis which is substantially parallel to the longitudinal axis of the harvester. In some machines the rotors perform both the threshing and separating action upon the cut crop flow delivered thereto. In other machines, such as 'hybrid' machines, a tangential-flow threshing cylinder is employed upstream of the rotors, wherein the rotors themselves serve a subsequent separating function.

Each crop processing rotor is mounted in a respective rotor housing which is generally cylindrical and which includes a grate or concave in the lower section to allow separated grain to fall onto an underlying collection pan. Enclosing curved cover assemblies are provided in an upper section of the housing.

Crop material is fed into a front inlet section of the rotor housings where the crop material is engaged by flighting elements on the rotor. The crop material is conveyed as a ribbon or mat in a generally rearward axial and helical path in the space between the rotor and the rotor housing. Axial conveyance of the crop material is driven by the interaction between helical guide vanes provided on the inside surface of the upper cover plates and threshing and separating elements provided on the rotor. Threshing of the crop material and the subsequent separation of the grain therefrom is mostly carried out in the lower portions of the helical path by the interaction between the threshing and separating elements respectively and the concave, the space between which is adjustable. Separated crop material passes by gravity through the grate whereas the longer bulkier straw residue is conveyed via an outlet or discharge section at the rear of the housing.

The cover plates are substantially half cylindrical in shape and are mounted along respective outer and inner longitudinal edges to fixing points provided by the machine frame. Flanges are often provided along the edges of the cover plates so as to provide means of fastening to the frame by bolts.

For the sake of maintenance convenience it is known for the cover assembly to be formed from two separable cover plate sections; a front section and a rear section. It is also known to provide a seam between the cover plate sections that is angled with respect to the circumference of the housing so that the seam lays parallel with the angle of the guide vanes, thus avoiding the guide vanes intersecting the seam.

In order to separate the two cover plate sections there is a need for access from above the rotors. On some combine harvester architectures access from above the rotors is convoluted and difficult to achieve.

BRIEF SUMMARY OF INVENTION

In accordance with the invention there is provided a rotor top cover assembly for an axial-flow crop processor in a combine harvester, the cover assembly comprising first and second curved cover plate sections, at least one of which sections forming an upper part of a generally cylindrical shaped rotor housing for a crop processing rotor, a curved transition plate which nests radially inside, and is fastened to, adjoining respective end regions of the cover plate sections, and a plurality of helical vanes mounted in an axially spaced relationship along an inner surface of at least one of the cover plate sections, wherein at least one guide vane is mounted directly to the transition plate.

The provision of a transition plate on the inside of the rotor housing allows a maintainer to loosen and separate the cover plate sections from one another by accessing from inside the rotor housing. This is of particular advantage in a combine harvester having restricted access to the rotors from above and/or wherein removal of the rotor is relatively straightforward.

By placing guide vanes on the transition plate itself, the design freedom for the dimensions of the transition plate is improved. In other words, the transition plate can be made wider than the spacing between adjacent guide vanes.

The invention permits simple unfastening of the transition plate from inside the rotor housing without removal of the guide vanes.

The cover plate sections may include a rotor housing inlet which is located at the front of the processor and serves to define a transfer zone in which the crop is guided into the rotor housing. A transition plate in accordance with the invention can be employed to fasten one cover plate section to the rotor housing inlet.

The invention can be applied to a combine harvester having an axial-flow processor, whether that be a processor with a generally longitudinal flow or a transverse flow from inlet to outlet with respect to the vehicle axis. In all axial flow processors the crop material is conveyed in a mat in a generally spiral path from the inlet to the outlet.

In one preferred embodiment the transition plate is fastened to at least one of the cover plate sections by fastening elements which protrude from a radially inner surface of the transition plate at a position immediately in front of one of the vanes mounted to the transition plate. The fastening elements may be bolts which may, for example, be screwed from inside the housing into threaded weld nuts secured to the outside of the housing. It is recognised that the crop mat is engaged and guided along the rear face of the guide vanes. By locating the protruding fastening elements in front of the vanes, the heads thereof are protected from abrasive action of long-term movement of the crop thus significantly reducing wear of the protruding heads.

BRIEF DESCRIPTION OF THE DRAWINGS

Further advantages of the invention will become apparent from reading the following description of a specific embodiment with reference to the appended drawings in which.

DETAILED DESCRIPTION OF A SPECIFIC EMBODIMENT

An example embodiment of the invention will now described. Relative terms such as 'front', 'rear', 'left', 'right', 'vertical', 'horizontal', 'longitudinal' and 'transverse' will be made with reference to the longitudinal axis of a combine harvester travelling in the normal forward direction of travel indicated by arrow F in FIG. 1. The terms 'direction of conveyance', 'upstream', and 'downstream' are made with reference to the general flow of crop material through the combine harvester. The terms 'axial', 'radial' and 'tangential' will be used in relation to the rotation axis of the rotor.

Figure 1:
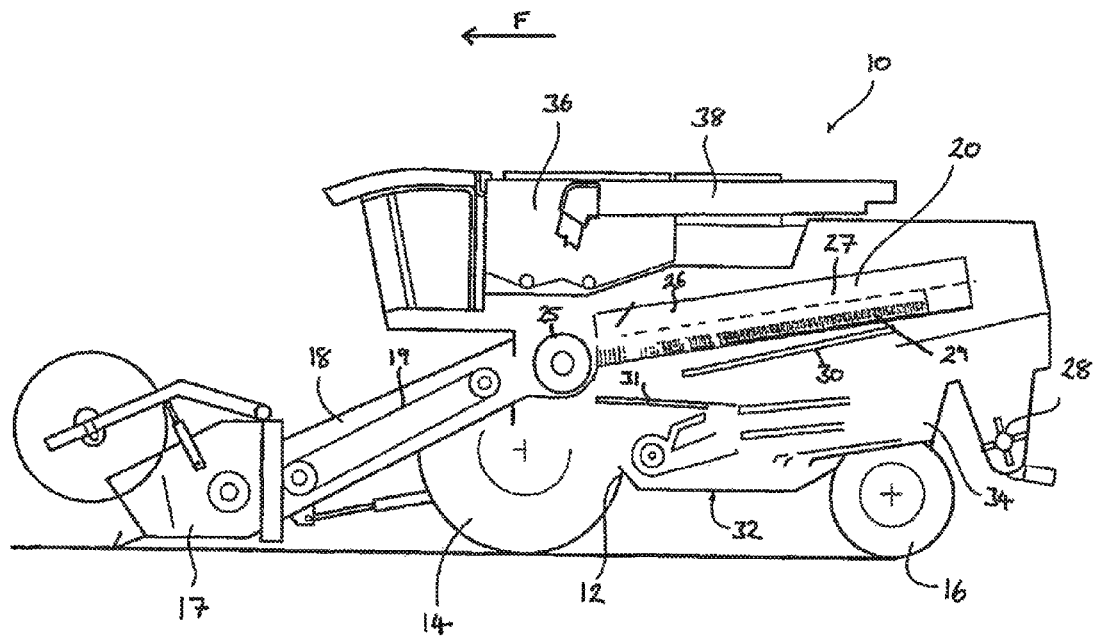
FIG. 1 is schematic side view of a combine harvester revealing the internal workings thereof.

With reference to FIG. 1 a combine harvester 10 includes a frame 12, front wheels 14 and rear steerable wheels 16. A cutting header 17 is detachably supported on the front of a feederhouse 18 which is pivotable about a transverse axis to lift and lower the header 17 in a conventional manner.

The combine 10 is driven in a forward direction F across a field of standing crop in a known manner. The header 17 serves to cut and gather the crop material before conveying such into feederhouse 18 and elevator 19 housed therein. At this stage the crop stream is unprocessed. It should be understood that combine harvesters are employed to harvest a host of different crops including cereal, rice, corn and grass seed. The following description will make reference to various parts of the cereal crop stream but it should be understood that this is by way of example only and does not by any means limit the applicability of the invention to harvest other crops.

The cut crop stream is conveyed rearwardly from the feederhouse 18 to a processor designated generally at 20. The processor 20 includes a pair of axial flow threshing and separating rotors which are each housed side-by-side inside a respective rotor housing 21,23 and are fed at their front end, via a rotor housing inlet section 85, by a feed beater 25. The rotors serve to thresh the crop stream in a front 'threshing' region 26, separate the grain therefrom in a rear 'separating' region 27, and eject the straw residue through the rear of the machine either directly onto the ground in a windrow or via a straw chopper 28.

As will be explained in more detail below, each rotor housing 21,23 comprises a combination of concave sections and separating grate sections 29 in the underside of the housing which allow the separated material to fall by gravity onto return pan 30 located below. Return pan 30 comprises an oscillating rippled tray-like structure and serves to convey the collected grain forwardly to a front edge from where the grain falls on to a grain pan 31. The collected mix of grain kernels, chaff, unthreshed tailings and shorter straw is conveyed rearwardly by grain pan 31 into a cleaning unit designated generally at 32.

Cleaning unit 32 is of a known construction and includes oscillating sieves which sort the crop material, ultimately ejecting residue through the rear of the machine 34 whilst the clean grain is conveyed by a (not shown) elevator to an on-board storage tank 36. For completeness, the combine 10 includes an unloading system which includes an unloading auger 38 shown in part in FIG. 1.

The invention relates to the construction of the rotor housings, and in particular, the top cover sections thereof.

Figure 2:
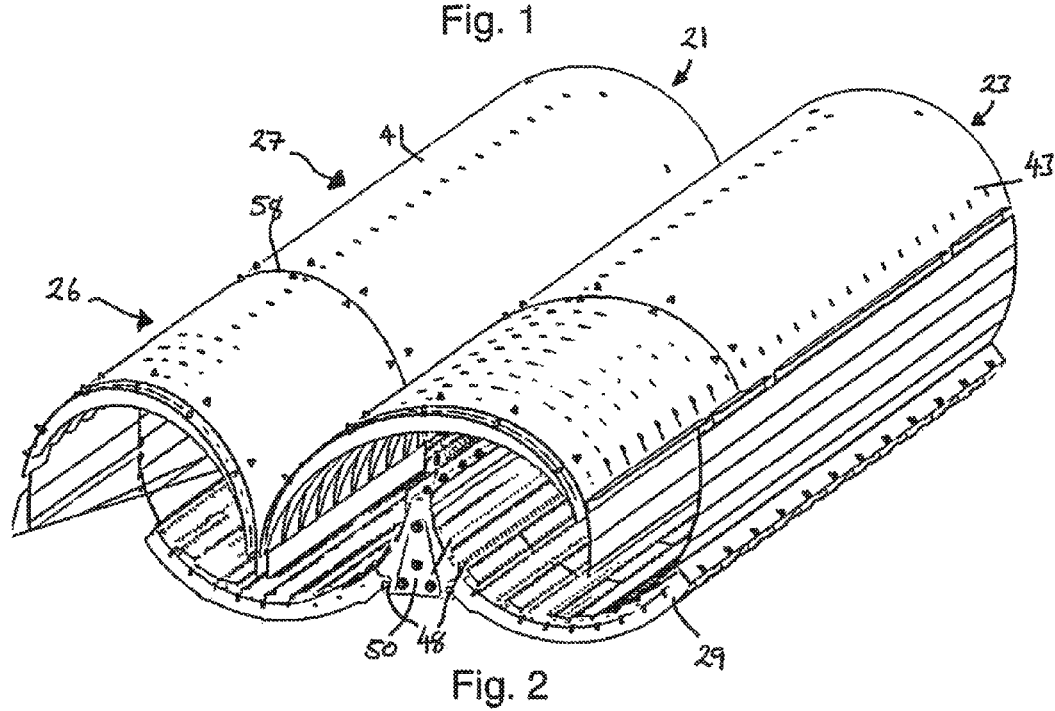
FIG. 2 is a front perspective view of a twin rotor housing assembly constructed in accordance with an embodiment of the invention, shown with the rotors removed.
Figure 3:
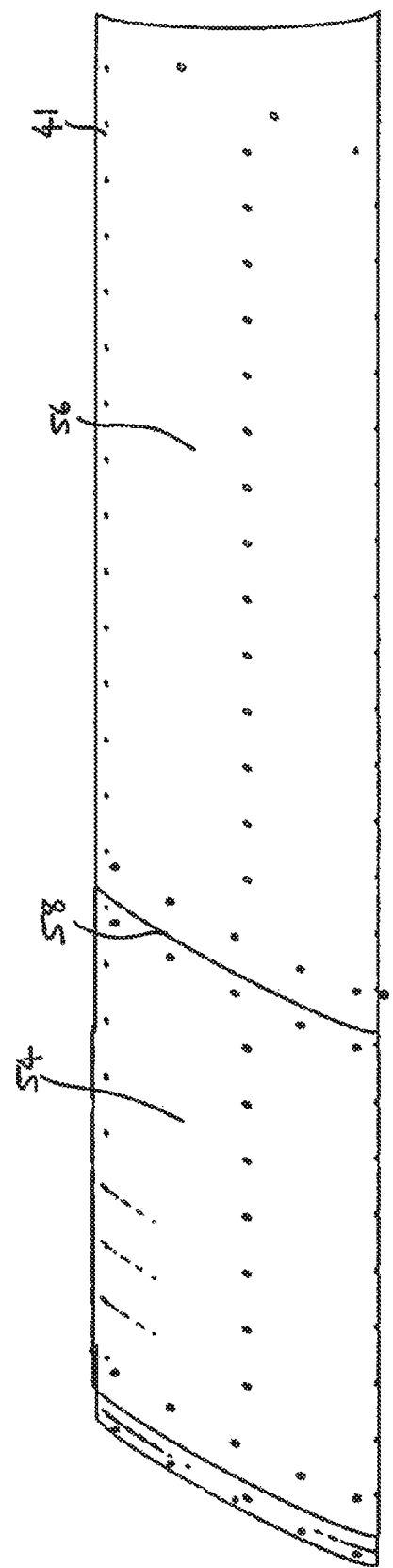
FIG. 3 is a plan view of the right-hand rotor housing of the twin housing assembly of FIG. 2.
Figure 4:
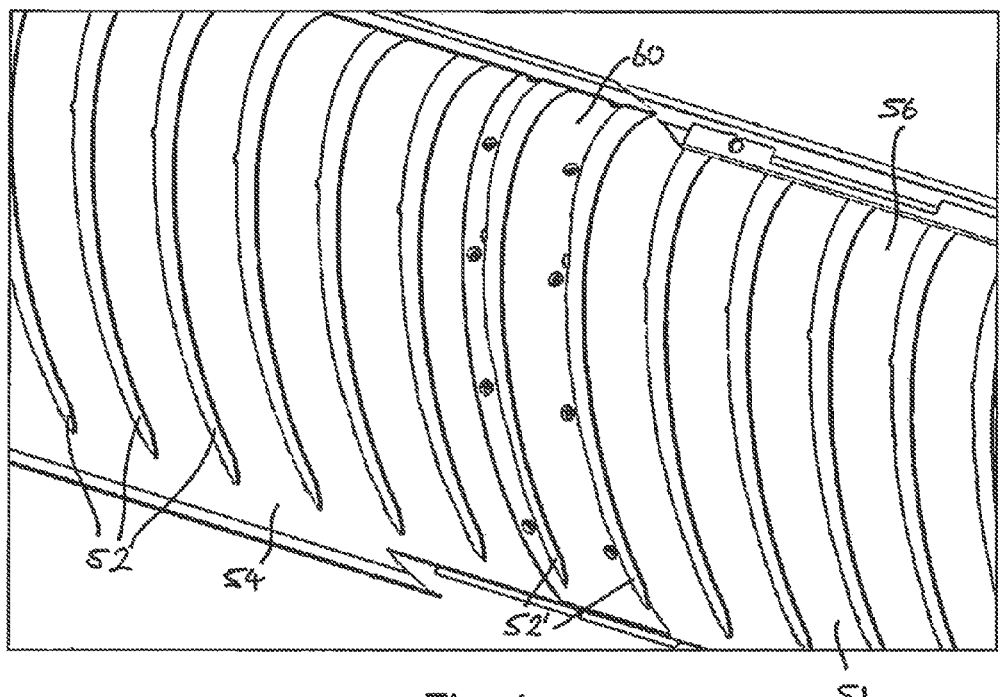
FIG. 4 is an underside perspective view of the right-hand top cover assembly of the rotor housing of FIG. 3.

It should be understood that only the left-hand side of processor 20 can be seen in FIG. 1. The twin rotor housing assembly can be seen in FIG. 2. The housing assembly comprises a left-hand rotor housing 23 and right-hand rotor housing 21. It should be understood that the threshing and separating rotors are omitted from FIG. 2 for ease of explanation.

The rotor housings 21,23 are identical in construction other than being a mirror image or 'handed' version of the other.

As mentioned above each rotor housing 21,23 comprises a lower grate section 29 and a curved, non-perforated, top cover plate 41,43. Each lower grate section 29 includes one or more arcuate adjustable concave sections in the front threshing region 26, and one or more arcuate separator grates in the rear separating region 27. At least the concave sections are pivotable about a longitudinal axis 48 proximate to the centre frame rail 50 so as to allow adjustment of the spacing between the concave and the rotor threshing elements as is known. It should be understood that the arcuate concave and grate sections may be formed of one or more sections as is known in the art and may have an associated actuator (not shown) for adjustment around respective axes 48.

Central frame member of rail 50 forms part of the frame 12 and is fixed in relation to the chassis 12. The frame member 50 has an elongate structure and is located between the rotor housings 21,23. The frame member 50 provides a mounting location for both the grates 29 and for the top cover plates 41,43.

Figure 5:
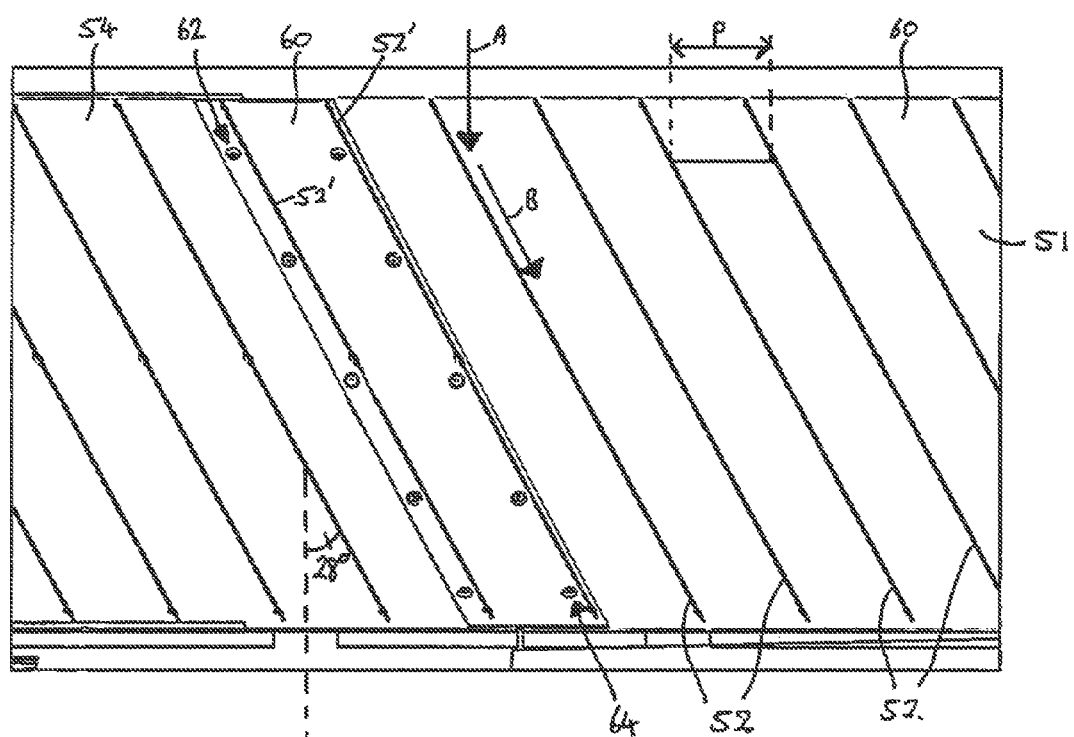
FIG. 5 is a bottom view of the top cover assembly of FIG. 4.
Figure 6:
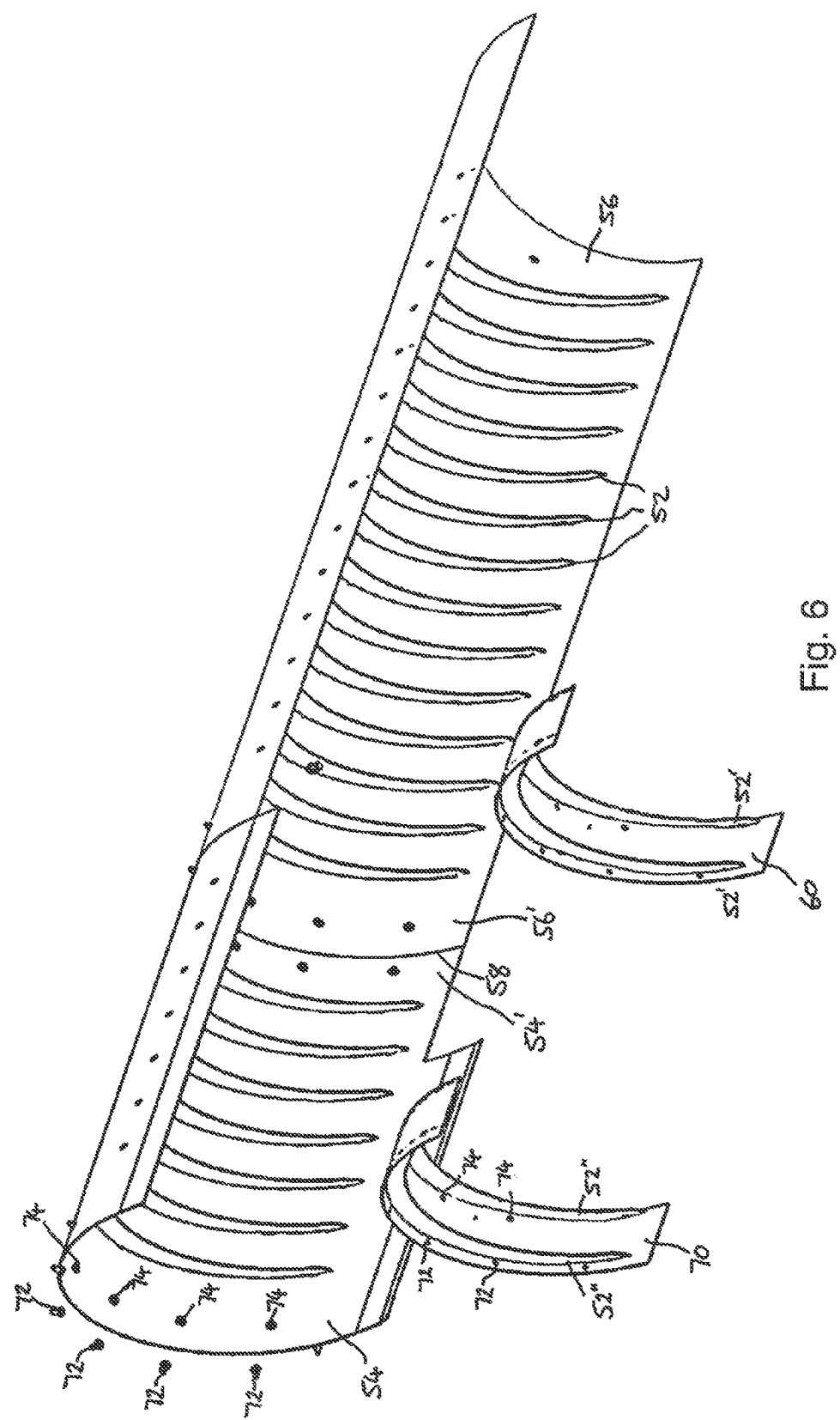
FIG. 6 is an underside perspective view of the right-hand cover assembly of FIG. 4 showing the front and intermediate transition plates spaced therefrom; and, FIG. 7 is an underside perspective view of the intermediate transition plate in isolation.
Figure 7:
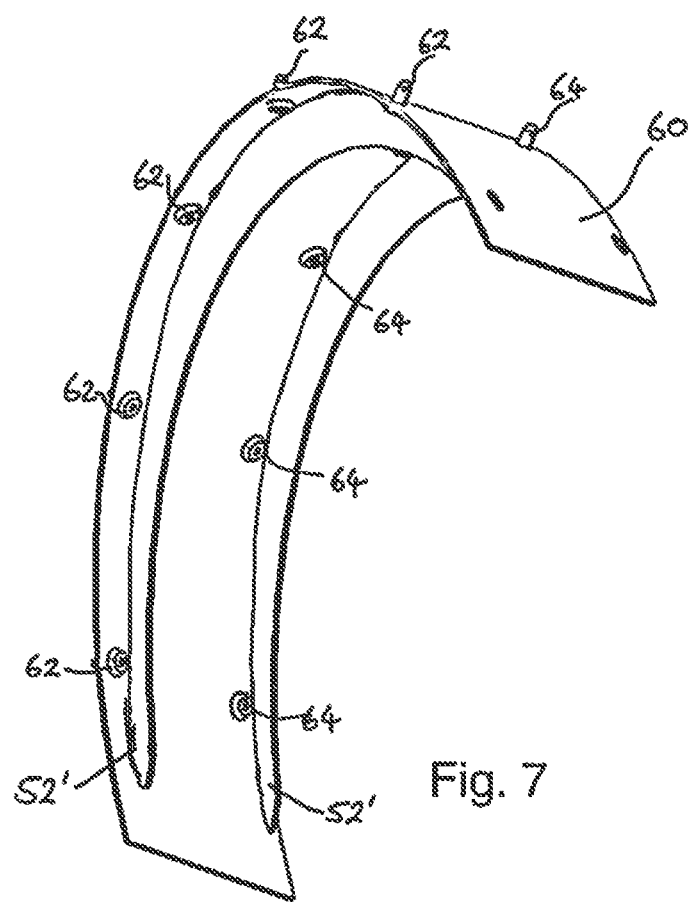

The top cover plates 41,43 have mounted on their inside surface 51 respective sets of arcuate or helical guide vanes 52 each being secured in an axially spaced relationship with a spacing or pitch 'p' (FIG. 5). The guide vanes 52 extend radially from the inner surface 51 of the cover plates 41,43 towards the rotor axis and cooperate with crop engaging flighting and elements (not shown) on the rotor to convey the crop mat in a rearward spiral path. In the illustrated embodiment the guide vanes 52 are disposed at 28° to the circumference although it shall be appreciated that this angle may vary.

It should be appreciated that the guide vanes 52 may be mounted to the inside of the rotor housings 21,23 in an adjustable manner, as is known in the art, to permit the angle of the guide vanes with respect to the housing circumference to be varied.

To explain the crop conveyance more clearly, arrow 'A' in FIG. 5 represents crop material moving circumferentially as it is engaged by the guide vanes 52. As the crop material engages the guide vanes 52 in the top region of the housing 21 the rear edge of each guide vane steers, or scrapes, the material rearwardly and helically in the direction of arrow 'B'.

Referring now only to the left-hand top cover plate 41, the cover plate 41 comprises a front cover plate section 54 and a rear cover plate section 56. The cover plate 41 is divided into more than one part to facilitate ease of disassembly for maintenance. The front and rear cover plate sections 54,56 meet at a seam 58 which is formed at an angle of 28° to the circumference of the housing to match that of the guide vanes 52. The sections 54,56 abut one another along the seam 58 and are joined to one another by an intermediate transition plate 60 which nests inside the cover plate 21.

A first row of bolts 62 fastens the intermediate transition plate 60 to a rear end region 54' of front cover plate section 54. A second row of bolts 64 fastens the intermediate transition plate 60 to a front end region 56' of rear cover plate section 56. Each row of bolts 62,64 comprises a plurality of bolts spaced along a line which is parallel to the seam 58. In this example embodiment each bolt is inserted from inside the rotor housing 21 and held within a respective threaded weld nut secured to the outside of the housing. However, it is envisaged that bolts may be inserted from the outside and the weld nuts may also be replaced with standard nuts.

The intermediate transition plate 60 has welded on its inside (concave) surface a pair of guide vanes 52'. When the intermediate transition plate 60 is bolted in position, the guide vanes 52' form part of the set of guide vanes 52 matching the spacing thereof.

The two rows of bolts 62,64 are located so as to be immediately in front of a respective one of the guide vanes 52' mounted to the intermediate transition plate 60. Advantageously, the bolt heads which protrude from the inner surface of the cover plate 41 are thus shielded at least in part by the adjacent guide vanes 52'. This has the effect of reduced wear on the bolt heads. This is best illustrated perhaps in FIG. 5 which shows the crop flow (arrows 'A' and 'B') moving along the rear faces of the guide vanes 52 thus keeping the abrasive action thereof away from the bolt heads.

The front end of the front cover plate section 54 is connected to a rotor housing inlet section 85 by a front transition plate 70. In a similar fashion to the intermediate transition plate 60, front transition plate 70 nests inside a front region of the front cover plate section 54 and has welded on its inside surface a pair of guide vanes 52". Two rows of bolts 72,74 are located so as to be immediately in front of a respective one of the guide vanes 52" mounted to the front transition plate 70. The first row of bolts 72 secures the front transition plate 70 to a rear region of the rotor housing inlet 85. The second row of bolts 74, displaced axially rearward from the first row of bolts 72, secures the front transition plate 70 to the front cover plate section 54.

It should be emphasized that the above-described embodiment of the present disclosure is merely a possible example of implementation, merely set forth for a clear understanding of the principles of the disclosure. Many variations and modifications may be made to the above-described embodiment of the disclosure without departing substantially from the spirit and principles of the disclosure.

The invention claimed is:

1. A combine harvester comprising an axial-flow crop processor having a rotor top cover assembly, wherein the crop processor is aligned longitudinally and has an inlet at the front end and a crop discharge outlet at the rear, and wherein the crop processor is configured to convey crop material in a mat in a generally spiral path from the inlet to the outlet, the cover assembly comprising first and second curved cover plate sections, at least one of which sections forming an upper part of a generally cylindrical shaped rotor housing for a crop processing rotor, a curved transition plate which nests radially inside, and is fastened to, adjoining respective end regions of the cover plate sections, and a plurality of helical vanes mounted in an axially spaced relationship along an inner surface of at least one of the cover plate sections, wherein at least one guide vane is mounted directly to the transition plate, wherein the transition plate is fastened to at least one of the cover plate sections by a row of fastening elements which protrude from a radially inner surface of the transition plate at a position immediately in front of one of the vanes mounted to the transition plate, wherein the row of fastening elements is aligned parallel to said at least one guide vane.

2. The combine harvester according to claim 1, wherein both the first and second cover plate sections form said upper part of the rotor housing.

3. The combine harvester according to claim 1, wherein said second cover plate section forms part of a rotor housing inlet.

4. The combine harvester according to claim 1, wherein the fastening elements are bolts.

5. The combine harvester according to claim 1, wherein the first and second curved cover plate sections meet at a seam which is aligned so as to be parallel with said row of fastening elements.

\* \* \* \* \*